(12) United States Patent
Grystan et al.

(10) Patent No.: US 9,372,989 B2
(45) Date of Patent: Jun. 21, 2016

(54) ROBUST MALWARE DETECTOR

(71) Applicant: Systems of Information Security 2012, Odessa (UA)

(72) Inventors: Volodymyr Grystan, Dnepropetrovsk (UA); Evgeny Tumoyan, Taganrog (RU); Ivan Romanenko, Dnepropetrovsk (UA); Anton Kukoba, Dnepropetrovsk (UA); Anatolii Sviridenkov, Smolensk (RU); Rusin Dmitry Evgenyevich, Nizhny Novgorod (RU)

(73) Assignee: SYSTEMS OF INFORMATION SECURITY 2012, Odessa (UA)

( * ) Notice: Subject to any disclaimer, the term of this patent is extended or adjusted under 35 U.S.C. 154(b) by 0 days.

(21) Appl. No.: 14/180,110

(22) Filed: Feb. 13, 2014

(65) Prior Publication Data
US 2014/0237596 A1    Aug. 21, 2014

Related U.S. Application Data

(60) Provisional application No. 61/765,171, filed on Feb. 15, 2013.

(51) Int. Cl.
*H04L 29/06* (2006.01)
*G06F 21/56* (2013.01)
(52) U.S. Cl.
CPC ..................................... *G06F 21/56* (2013.01)
(58) Field of Classification Search
CPC ....................................................... G06F 21/56
See application file for complete search history.

(56) References Cited

U.S. PATENT DOCUMENTS

| 6,775,780 | B1 | 8/2004 | Muttik |
| 6,973,577 | B1 | 12/2005 | Kouznetsov |
| 7,376,970 | B2 | 5/2008 | Marinescu |
| 7,464,408 | B1 | 12/2008 | Shah |
| 7,552,479 | B1 * | 6/2009 | Conover et al. ................. 726/24 |

(Continued)

FOREIGN PATENT DOCUMENTS

| EP | 2306356 | 4/2011 |
| EP | 2492833 | 8/2012 |
| WO | 2006/036959 | 4/2006 |

OTHER PUBLICATIONS

Chandrasekar Ravi, R Manoharan, "Malware Detection using Windows API Sequence and Machine Learning", International Journal of Computer Applications, vol. 43, No. 17, pp. 12-16, Apr. 2012.*

(Continued)

*Primary Examiner* — Shawnchoy Rahman
(74) *Attorney, Agent, or Firm* — Peacock Myers, P.C.; Jeffrey D. Myers

(57) ABSTRACT

A system, method and computer readable medium for detecting and diffusing malware on a computer. Malware is analyzed to generate signatures and determine a fixing moment. All of the system calls of the operating system of a client computer are hooked and processed without emulation or the need for unpackers or decrypters, and a multi-level filter removes all system calls that are not associated with malware. The resulting system calls are accumulated on a per-thread basis and scanned, and the relevant threads are compared with the signatures to match with malware. The threads associated with malware are addressed at the fixing moment before the malware can operate to cause undesirable effects on the client computer.

30 Claims, 9 Drawing Sheets

(56) References Cited

U.S. PATENT DOCUMENTS

| | | | |
|---|---|---|---|
| 7,620,992 | B2 | 11/2009 | Monastyrsky et al. |
| 7,665,138 | B2 | 2/2010 | Song et al. |
| 7,779,472 | B1 | 8/2010 | Lou |
| 7,900,194 | B1* | 3/2011 | Mankins ............... 717/127 |
| 7,913,305 | B2 | 3/2011 | Bodorin et al. |
| 7,971,255 | B1* | 6/2011 | Kc ............... G06F 21/566 |
| | | | 713/164 |
| 8,028,301 | B2* | 9/2011 | Repasi ............ G06F 21/52 |
| | | | 726/22 |
| 8,028,336 | B2 | 9/2011 | Schuba et al. |
| 8,042,186 | B1 | 10/2011 | Polyakov et al. |
| 8,065,728 | B2 | 11/2011 | Wang et al. |
| 8,099,596 | B1 | 1/2012 | Rusakov et al. |
| 8,104,090 | B1 | 1/2012 | Pavlyushchik |
| 8,266,698 | B1 | 9/2012 | Seshardi et al. |
| 8,555,385 | B1* | 10/2013 | Bhatkar et al. ............ 726/22 |
| 8,881,282 | B1* | 11/2014 | Aziz et al. ............ 726/24 |
| 2007/0016914 | A1* | 1/2007 | Yeap ............... 719/328 |
| 2008/0016339 | A1* | 1/2008 | Shukla ............ G06F 21/53 |
| | | | 713/164 |
| 2008/0040800 | A1* | 2/2008 | Park ............... 726/22 |
| 2009/0049550 | A1* | 2/2009 | Shevchenko ...... G06F 21/56 |
| | | | 726/23 |
| 2011/0126205 | A1 | 5/2011 | Gaist |
| 2011/0126217 | A1 | 5/2011 | Gaist |
| 2011/0167434 | A1 | 7/2011 | Gaist |
| 2011/0271341 | A1 | 11/2011 | Satish et al. |
| 2012/0124667 | A1 | 5/2012 | Chiang et al. |
| 2012/0255004 | A1 | 10/2012 | Sallam |
| 2012/0290702 | A1* | 11/2012 | Vincent ......... G06F 9/45558 |
| | | | 709/223 |
| 2014/0250511 | A1* | 9/2014 | Kendall ............... 726/6 |

OTHER PUBLICATIONS

Carbone, Martim, et al. "Mapping kernel objects to enable systematic integrity checking." Proceedings of the 16th ACM conference on Computer and communications security. ACM, 2009.*

Rhee, Junghwan, Zhicliang Lin, and Dongyan Xu. "Characterizing kernel malware behavior with kernel data access patterns." Proceedings of the 6th ACM Symposium on Information, Computer and Communications Security. ACM, 2011.*

* cited by examiner

ROBUST MALWARE DETECTOR

CROSS-REFERENCE TO RELATED APPLICATIONS

This application claims priority to and the benefit of the filing of U.S. Provisional Patent Application Ser. No. 61/765,171, entitled "Robust Malware Detector", filed on Feb. 15, 2013, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

©2013 Systems of Information Security 2012. A portion of the disclosure of this patent document contains material that is subject to copyright protection. The owner has no objection to the facsimile reproduction by anyone of the patent document or the patent disclosure, as it appears in the United States Patent and Trademark Office patent file or records, but otherwise reserves all copyrights whatsoever.

FIELD OF THE INVENTION

The present invention relates to a system and method for protecting a computer against the harmful effects of malicious software and more particularly to a system and method for detecting the presence of malicious software on a computer and to diffusing malicious software before it can operate to cause undesirable effects on the computer.

BACKGROUND OF THE INVENTION

The proliferation of the use of computers, their interconnectivity and our reliance on them in our daily lives has given rise to the serious problem of the vulnerability of our computers and the information contained therein. Those who wish take advantage of this vulnerability have developed software to carry out their malicious intent.

This malicious software, or "malware", may take the form of "viruses", "worms", "Trojans", "spyware" or other such software that can operate on a computer to compromise the integrity of the computer and the information contained therein. Such programs can cause the computer to cease operating, grant access to the computer's information to unintended parties, monitor the computer's operations and collect sensitive information input into the computer by the user, such as personal and business records and passwords. Such programs can also self-replicate and spread out from an infected computer to a non-infected computer, thus propagating their malicious actions and causing harm on a great scale.

Given the great potential for harm posed by malware, methods for detecting the presence of malware on a computer and for diffusing the harmful effects of the malware have been developed.

Traditionally, there were two approaches to malware detection and diffusion: (i) static analysis; and (ii) dynamic analysis.

Static analysis extracts information from the program without launching the program. The subject file is processed and analyzed for characteristics of known malware by the use of sets of signatures. However, most malware is packed or encrypted and many different packers or encryptors are used. This creates significant problems with this type of analysis. Modern malware packers and encryptors are using polymorphism that prevents reliable signature based detection. As such it is desirable to remove the packers or encryptors first, before applying the signature. However, it is practically impossible to have unpacking or un-encrypting routines for each and every packer or encryptor and, in any event, it is costly and time consuming to address. Also, since the same packers and encryptors are used for both malware and non-malware, the use of this technique often results in a considerable percentage of false positives and wasted resources. To address this, the signatures are taken from packers and encryptors that use polymorphic algorithms to fight them. All of this requires the creation of more and more signatures that describe the same malware family.

A further static analysis technique that has been proposed builds signatures from the simplified control flow graph of the malware. This technique isolates all of the paths that may be traversed by the subject program and seeks to identify common paths between different samples of the same malware family. However, this technique uses a significant amount of computing time and is not scalable. As such, its effectiveness is limited.

Dynamic analysis requires the execution of the subject program and monitors the behaviour of the program during such execution. In proposed applications of dynamic analysis, the behaviour of the program is compared to signatures in a database or sets of expert created rules. When malware like behaviour is identified, action can be taken to diffuse the program.

The first problem with dynamic analysis is that permitting a potentially malicious program to run on a computer places the computer at risk. This has been addressed by running the program in an artificial environment which is isolated from the main computing environment and that seeks to emulate as many of the characteristics of the main computing environment as is reasonably possible. This "emulation" technique allows for the effects of malware to be isolated from the main computing environment. It is during such emulation process that the behaviour of the malware is analyzed and diffusion methods determined.

There are problems presented by emulation. First, it is not possible to emulate the computer's entire operating system. As such, compromises must be made which inherently gives rise to limitations to emulation and permits some malware to defeat emulation. This also makes emulation only suitable for malware that is subsequently introduced to the computer and not suitable for use on computers that are already infected with malware prior to the implementation of the detector. Second, the use of emulation is a considerable drain on the computer's resources and takes a significant amount of time to perform. This limits the overall performance of the computer and, in some cases, defeats the detector's inherent purpose.

Another known method of employing dynamic analysis for the detection of malware software involves the application of expert created rules. In fact, the application of expert created rules to an executing subject program is the dominant method in the industry for detecting malware. This is sometimes known as Host-Based Intrusion Prevention Systems or HIPS. Such rules can be applied to high-level events (such as Windows API, IRP or operating system callbacks) or to low-level events (such as system calls). The fundamental problem of this approach is the presence of false positives. The cause of this is the fact that the rules exist out of the context of the given program execution.

Also, it is necessary to consider the fact that malware tries to counteract the restrictions imposed by HIPS. An example of such counter-measures is the splitting of malware actions between different processes. The only way to mitigate that measure is to merge the different threads and process histories into a single context to which the rules will be applied. If the rule is formed in an unsuccessful way (such as when it is statistically often occurring in non-malware) a false positive will occur. The probability of the false positive is going to increase on the merged context. Other known counter-measures include discarding or compromising the program's history and damaging or compromising the list of rules. Furthermore, if malware modules are injected into an otherwise trusted processes, HIPS will fail to notice the injected process. As a result, HIPS based analysis may cause false positives and missed detections.

It has been proposed to employ a dynamic analysis involving the creation of behaviour signatures to detect malware. Such behaviour signatures are proposed to be created from select groups of API calls or system calls generated by the subject program. However, such limited API and system call based signatures are unreliable. For example, even if all API calls were analyzed, it is still possible for the malware to generate system calls directly. Accordingly, any signature based on API calls is incomplete. On the other hand, if a signature is based only on limited groups of system calls, then it is vulnerable to missed detections and exploitation by malware producers. As such, to be completely effective, it is desired for all of the subject program's system calls to be analyzed.

It is also desirable to use the detector on computers that are already infected with malware prior to the implementation of the malware detecting program. In this case, the malware may already have been injected into some trusted processes. Accordingly, it is required to process the entire operating system. However, the average computer operating system can generate thousands of system calls each second for a single process and up to 200,000 system calls each second overall. The use of previously proposed dynamic analysis on this volume of calls would lead to operating system stall.

Because the format of the behaviour signatures is important, signatures have been proposed that use the longest common subsequence (LCS). LCS patterns are obtained by comparing different malware samples of the same family. However pure LCS-based signatures have certain drawbacks. First, each system call must have an accompanying thread identifier. The signature based on system calls without thread identifiers, such as pure-LCS based signatures, will be vulnerable to defeat by a task switch from the operating system scheduler. Also, no thread-spread attempts will be detected. Furthermore, pure LCS-based signatures do not allow for "junk call" insertions or system call permutations. Malware will inevitably use "junk calls" to defeat pure LCS-based signatures. System call permutations can also happen as the result of operating system scheduler actions or as the result of the malware modifications, which will defeat pure LCS-based signatures.

Considering the limitations of the existing malware detection and diffusion techniques, it is desired to have a system and method for detecting the presence of malicious software on a computer and to diffusing malicious software before it can operate to cause undesirable effects on the computer. It is desired that such a system and method analyses all of the system calls of the operating system in real time on the main computer without emulation or the need for unpackers or decrypters and detects the malware without the use of HIPS or control flow graphs, using signatures resistant to OS scheduler actions, malware counter acts and to malware modifications, and diffuses the malware before the malware can operate to cause harm to the main computer. It is further desired that such a system and method operates efficiently with respect to computer resources and time and can detect and diffuse both known and previously unknown malware on computers that are infected before and after introduction of the malware detector to the computer.

BRIEF SUMMARY OF THE INVENTION

The present invention discloses a system and method for detecting the presence of malware on a computer and to diffusing malware before it can operate to cause undesirable effects on the computer.

The present invention also discloses a system and method for generating signatures for malware by analysing system calls and determining the moment during the execution of malware when the malware may be diffused prior to causing undesired effects to the computer.

The present invention also discloses a system and method for detecting malware on a computer by analysing all of the system calls of the operating system of the main computer without emulation or the need for unpackers or decrypters.

The present invention also discloses a system and method for detecting malware on a computer by analysing all of the system calls of the operating system of the main computer without jeopardizing the stalling of the computer's operations.

The present invention also discloses a system and method for detecting malware on a computer without the use of HIPS or control flow graphs.

The present invention also discloses a system and method for detecting malware on a computer without being vulnerable to defeat by a task switch from the operating system scheduler or malware counter actions.

The present invention also discloses a system and method for diffusing malware on a computer before the malware can operate to cause harm to the main computer.

The present invention discloses a system and method for detecting the presence of malware on a computer and to diffusing malware before it can operate to cause undesirable effects on the computer that operates efficiently with respect to computer resources and time and can detect and diffuse malware on computers that are infected before and after introduction of the malware detector to the computer.

BRIEF DESCRIPTION OF THE DRAWINGS

The accompanying drawings, which are incorporated into and form part of the specification, illustrate one or more embodiments of the present invention and, together with the description, serve to explain the principles of the invention. The drawings are only for the purpose of illustrating one or more preferred embodiments of the invention and are not to be construed as limiting the invention. In the figures.

DETAILED DESCRIPTION OF THE INVENTION

Figure 1:
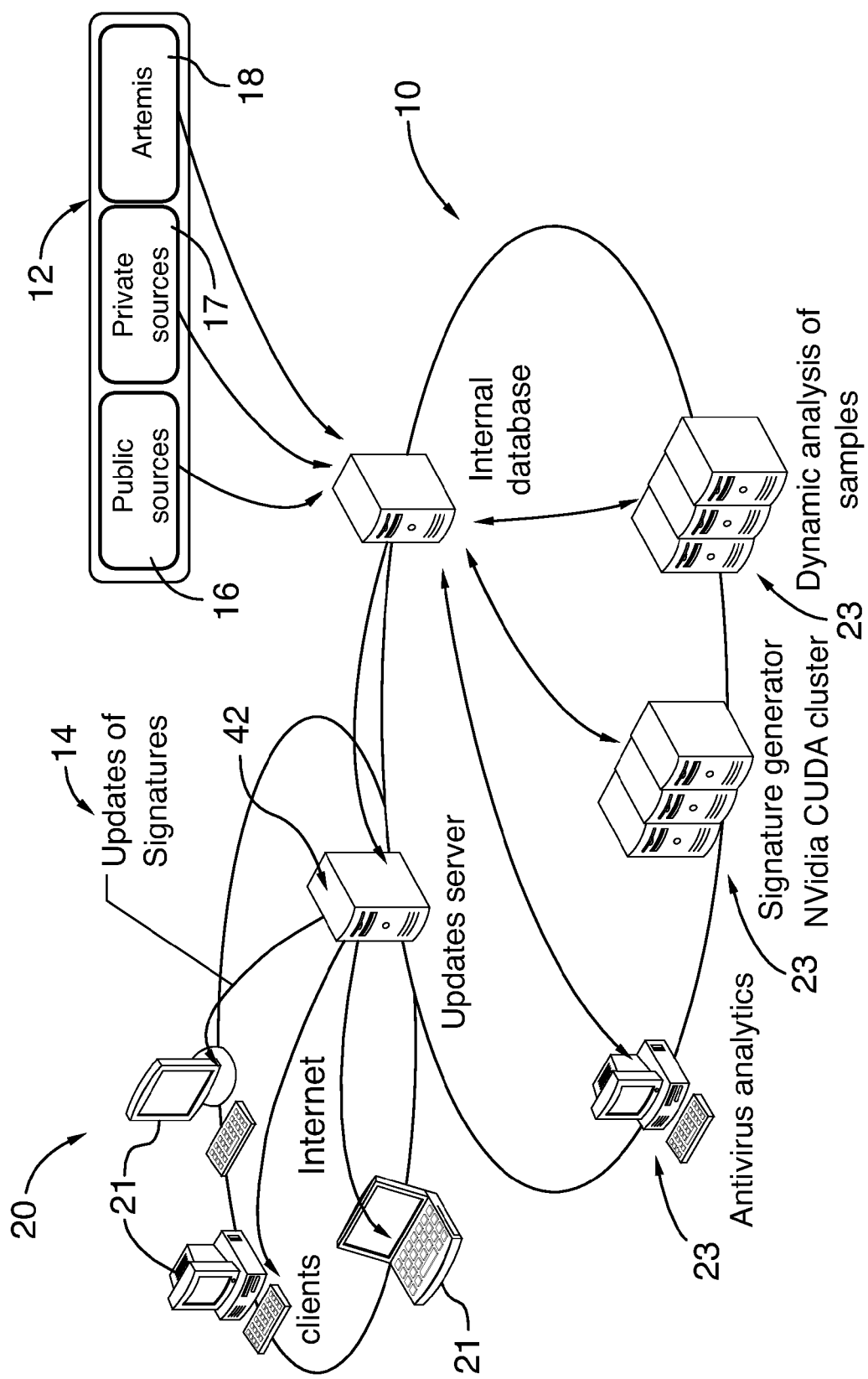
FIG. 1 is a pictorial diagram showing a general overview of the architecture of the present invention.

FIG. 1 shows the general overall architecture of the present invention. It comprises a server side 10 and a client side 20.

Figure 4:
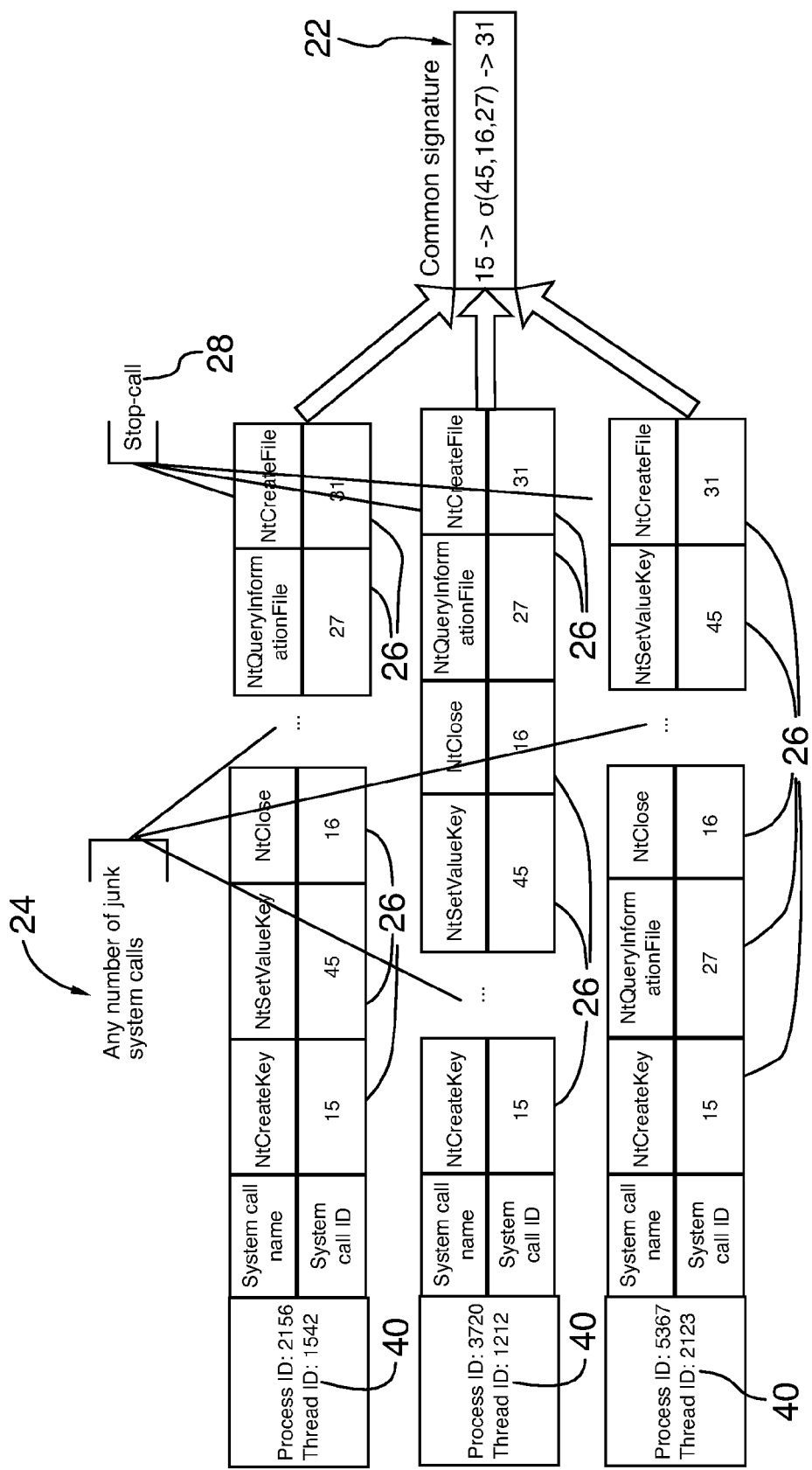
FIG. 4 is a block diagram showing an example of a signature generated by the present invention.

As shown in FIG. 1 and FIG. 4, the server side 10 functions as the malware laboratory where malware samples 12 are processed, signatures 22 are generated and updates 14 are sent to the client side 20.

Malware samples 12 are obtained from multiple sources, including public sources 16, such as malware-research.co.uk, private sources 17, such as virustotal.com, as well as a proprietary honeypot 18 derived from experts. The malware samples 12 are processed in virtual machines 23 where signatures are formed. The collection of malware samples 12 is continuously updated by the inclusion of new malware samples 12.

FIG. 4 shows an example of a signature 22. The signatures 22 are formed by joint fully and/or semi-automatic analysis of the system calls history with the help of bioinformatics methods to determine the common sequences between the different histories of different processes. Hidden Markov Models algorithms and mathematical statistics are used that allow for system calls 26 within the signature 22 to be swapped and for "junk calls" 24 to be inserted between meaningful system calls 26.

Figure 3:
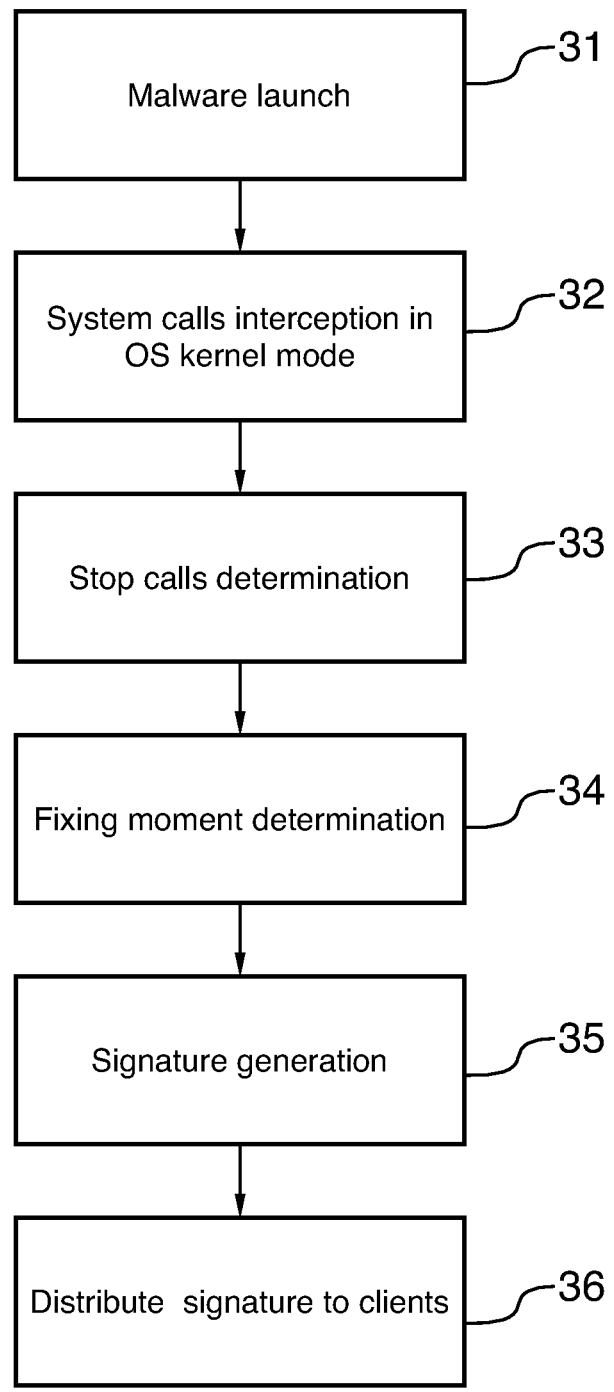
FIG. 3 is a block diagram showing the steps for creating signatures for malware on the server side according to the present invention.

FIG. 3 shows the steps for creating signatures 22 for malware on the server side 10 according to the present invention. The processing of a malware sample 12 begins with block 31 launching the malware on the virtual machine 23. The complete behaviour of the program is analysed in block 32 by intercepting all of its system calls 26 in kernel mode. The system calls 26 are scanned in block 33 for stop calls 28.

As shown in FIG. 4, a stop call 28 is a system call 26 which is able to make irreversible or hard-reversible changes in the system, whether malicious or not. Examples of stop calls include, but are not limited to, writing to a file or registry, starting a driver, sending data to a network, NtAllocateVirtualMemory, NtRaiseHardError, and NtCreateDebugObject.

The identification of the stop calls 28 for the malware allows for the determination of the moment during the malware's operation that the malware must be interrupted before it can make irreversible changes, that is, before it can cause harm to the computer, its contents or its users. This moment is called the fixing moment 29 and is determined in block 34.

Figure 8:
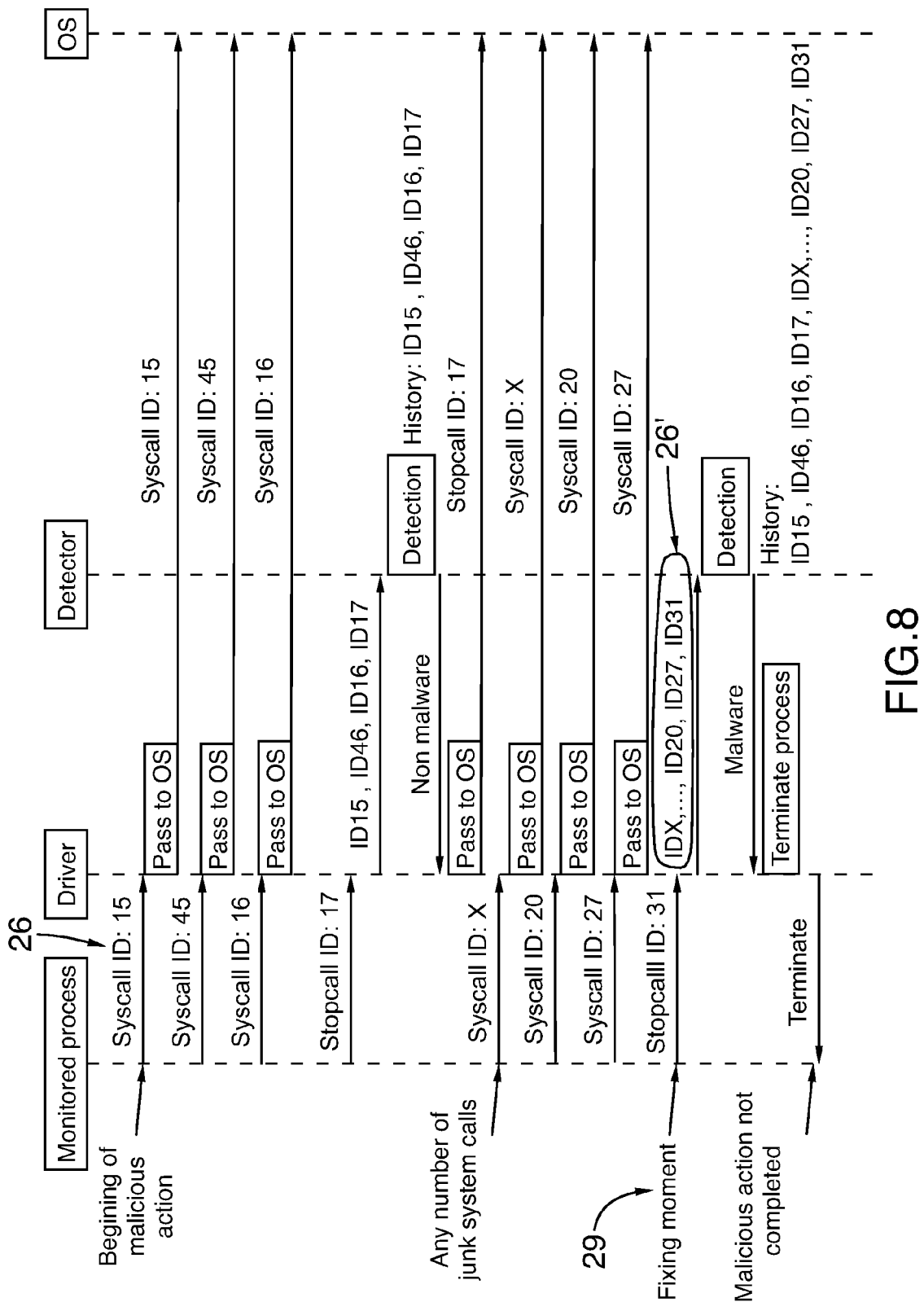
FIG. 8 is a UML sequence diagram showing an example for determining the fixing moment of the present invention.

As shown in FIG. 8, the fixing moment 29 is determined as follows. The malware is launched on a virtual machine 23 using software that shows the system calls 26 used by the program. The system changes are analyzed, revealing dangerous Windows API functions. Examples of such functions include, but are not limited to, the driver start, network connection and inject. Most of the high level API calls are converted into one or many system calls 26. When dangerous Windows API are revealed, they are compared with the corresponding system calls 26, which yield the end of the future signature 22. This is the fixing moment 29. The system calls 26 after the fixing moment 29 are no longer relevant. From this, several sets of the system calls 26' that are cut off to this fixing moment are produced. These sets will form the basis of the future signature 22, which are generated in block 35 and distributed to the client computers 21 on the client side 20 in block 36.

As shown in FIG. 4, each signature 22 will contain at least one stop call 28. Also, each system call 26 within the signature 22 is bound to a thread identifier 40. In this way, the signature 22 is immune from defeat in the event the operating system scheduler decides to perform a task switch.

As shown in FIG. 1, the signatures 22 for the processed malware 12 are sent by the update server 42 to the client side computers 21 through the Internet or other network. This process of signature generation and distribution can be continuous, periodic and automatic.

Armed with the signatures 22 for the processed malware 12, the malware detection and diffusion software on the client computer 21 operates to protect the computer 21 from malware threats.

Figure 2:
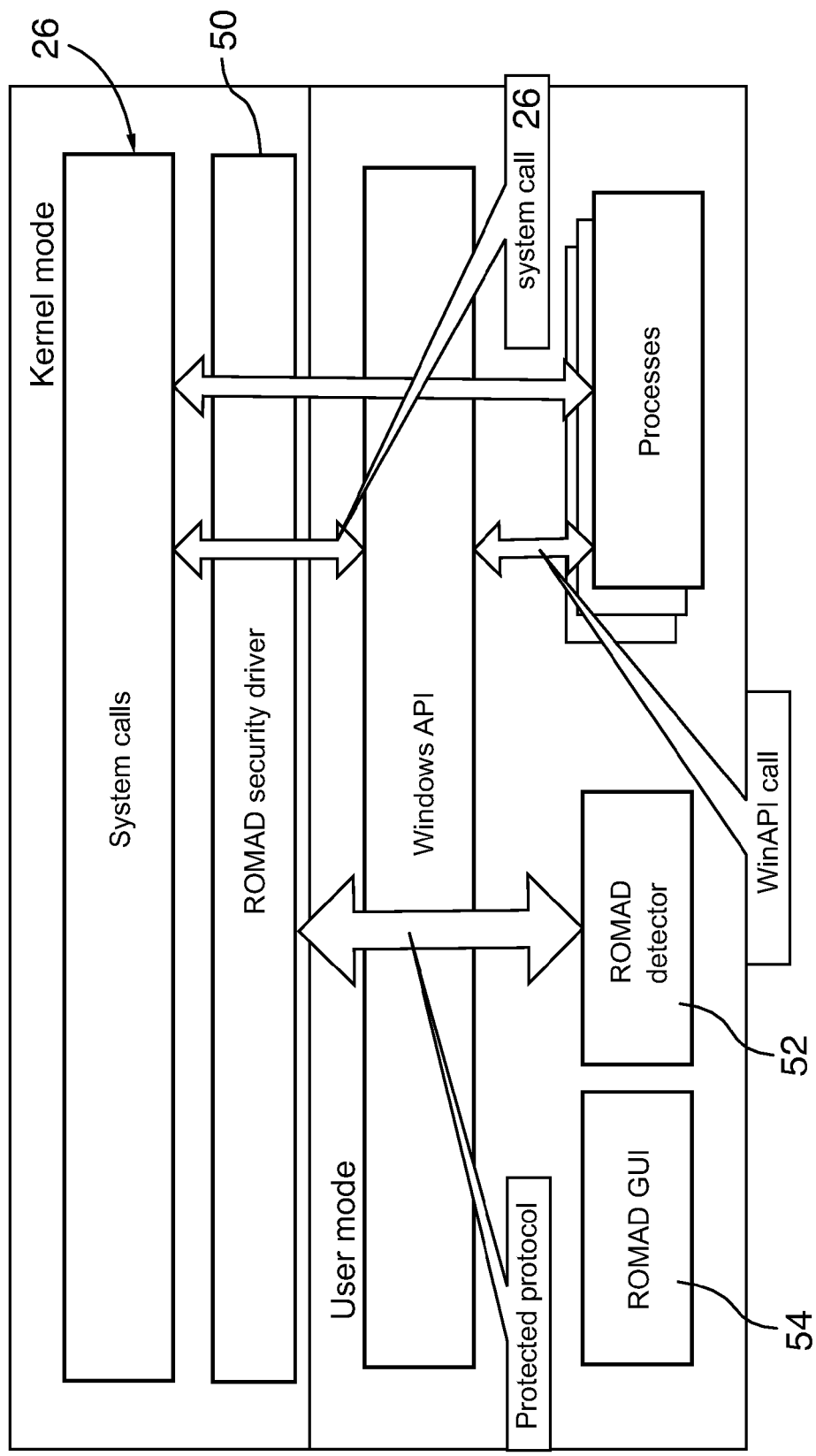
FIG. 2 is a block diagram showing the interactions of the client side components of the present invention.

The detection software on the client side computers 21 operates in real time and employs an enhanced dynamic analysis of the subject program. FIG. 2 shows the components of the detection software found on the client side computers 21, which include a driver 50 which hooks all of the system calls 26 of the operating system, a detector 52 that functions as the service that operates in user mode to detect malware and a graphical user interface 54 which provides controls for the components such as starting, stopping, mode switching and responding to and blocking detected malware.

Figure 5:
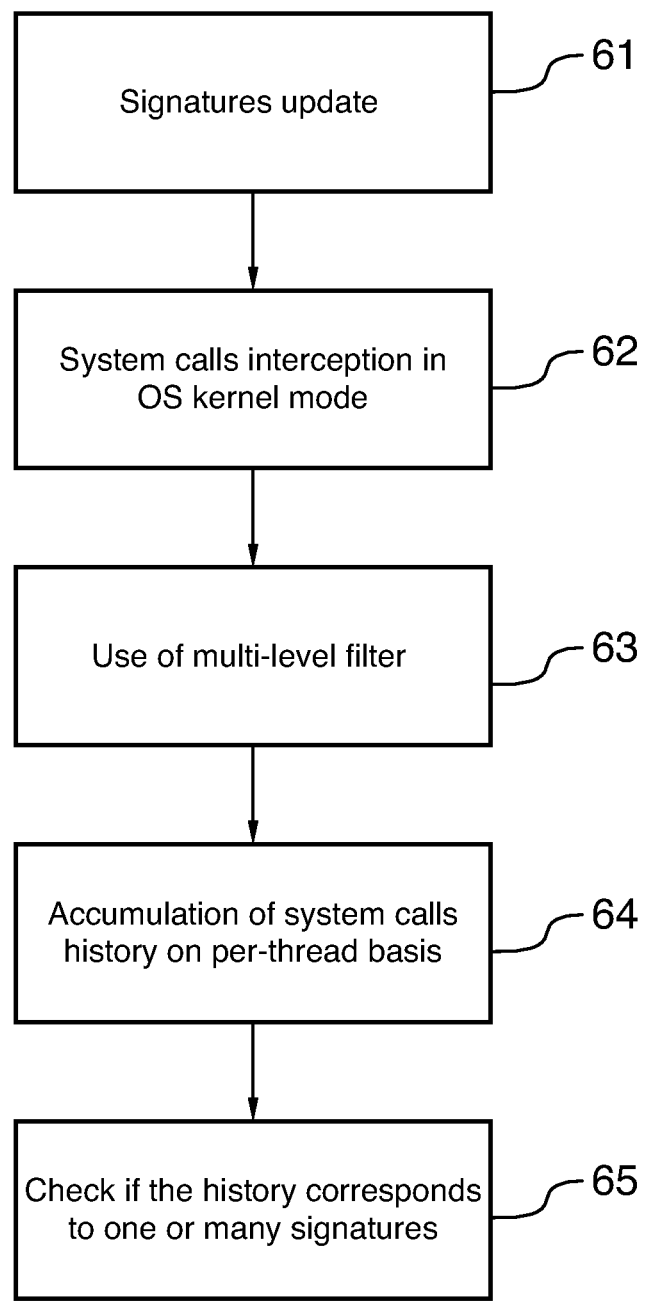
FIG. 5 is a block diagram showing the steps for detecting malware on the client side according to the present invention.

FIG. 5 shows the steps for detecting malware software 12 on the client side computers 21. The detection process begins in block 61 with the launching of the subject program. This is not done in an emulated environment, but rather is done in the main computing environment because malware 12 will be detected and diffused at the fixing moment 29 before it can make irreversible changes, that is, before it can cause harm to the computer 21.

For this same reason, the detection software is not concerned about the presence of any packers or encryption that may be present with any subject program. The subject program is permitted to unpack or decrypt itself. Alternatively, packers may be skipped and the detection process may be commenced at a subsequent appropriate segment, such as the original entry point.

Once the malware detection method of the present invention is launched, the detection software's driver uses a subsystem in block 62 to hook all of the system calls 26 at the kernel level. This subsystem operates under the OS Windows control. Thus, the processes are run in a natural environment, and both the newly created processes and pre-existing processes are monitored. This permits the detection of malware 12 even in a computer that was infected prior to the introduction of the detection software.

The subsystem of block 62 works in ring-0. The PatchGuard on the Windows x64 systems does not interfere with the subsystem and, thus, is not deactivated. Consequently, 100% of the system calls 26 are collected, in contrast to the mere 10% of process information that is collected by traditional HIPS based detectors. Moreover, the inherent defense mechanisms of the operating system itself, such as bitlocker and digital signatures of system files, remain untouched.

The hooking of all of the system calls 26 initially results in a very large number of system calls 26. So large is the number of system calls 26 that without some means of handling them, the detection software would stall the operations of the client computer 21. For example, an average system with Windows 7 produces up to 200,000 system calls per second. The operating system's actions in response to each system call is so carefully optimized that even if only non-trivial actions were taken on each system call, the load will be so high that the system itself will become unusable.

As the stop calls 28 are relatively rare compared to regular system calls 26 (the ratio is about 1:38) it is desirable to perform the check only when a stop call 28 arrives. However, the system calls flow, even structured in terms of stop calls 28, still remains prohibitively large to permit real time functioning. That is why a multi-level filtering process is employed in block 63.

Filtering processes are known that operate on the basis of trusted and untrusted processes. The detection software of the present invention uses this concept as a first-level cache. The credibility of the process is based on a digital signature. However, even trusted processes can be corrupt. This is because it is known that current malware employs techniques of avoiding digital signatures, including stealing of certificates, issuance of fraudulent certificates, adding dlls into the signed installers and trojans, which are signed by the governmental keys. Also, there are many popular programs that have unsigned third party modules within their address space.

Figure 6:
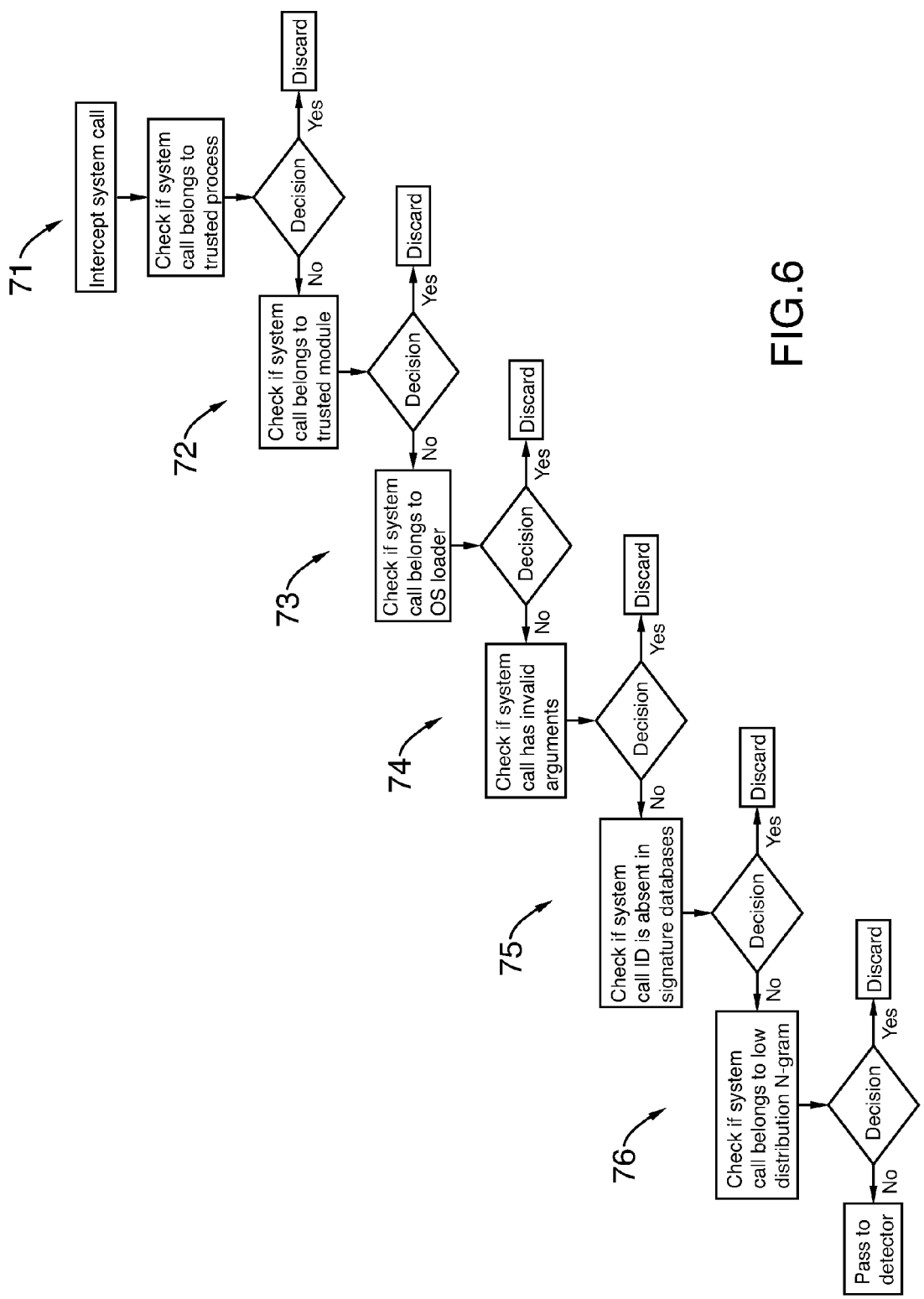
FIG. 6 is a flow diagram showing the routine for multi-level filtering of systems calls through the multi-level filter of the client side detection system of the present invention.

As shown in FIG. 6, a first filtering process 71 is used that identifies trusted processes by checking the criteria, including following:

Check the correctness of the digital signature;
Check if the digital signature corresponds to the executable module;
Check if the executable module's integrity is not altered;
Check if the certificate of the digital signature is not revoked;
Check if the certificate of the digital signature is not black listed;
Check if the digital signature is built with the help of collision-resistant cryptographic hash-function; and
Check if the process does not contain injected code.

If the process passes these tests, it is affirmed and is filtered out, discarded and excluded from further processing. As long as the integrity of the trusted processes are not violated, the trusted processes are excluded from consideration. However, a log of these processes is maintained and updated and if any crucial change in the trusted process is found, such as an attempt of APC-injection of an unsigned module, then the status of the process will be changed to "untrusted" and the filter will start checking the signatures.

The untrusted processes are then passed through a second level filter 72. The second level filter discards the systems calls 26 belonging to trusted modules, which are system calls 26 from trusted locations within the untrusted processes and are deemed not to be associated with malware.

As shown in FIG. 6, the untrusted processes are then passed through multiple subsequent level filters, being filters 73, 74, 75 and 76, which discard system calls 26 which are deemed not to be associated with malware, such as:

the system calls 26 generated by OS loader;
the system calls 26 that will not be executed by the OS (including but not limited to: the system calls with invalid arguments);
the system calls 26 if the given system call 26 is absent in the signature database;
the system calls 26 generated by malware with the help of spectrum analysis and statistical analysis of low distribution N-grams of system calls.

These system calls 26 are affirmed and are filtered out, discarded and excluded from further processing. The remaining system calls 26 are suspect and are accumulated on a per thread basis in block 64 before they are passed on to the detector for analysis in block 65. This multi-level cache filtering process results in a manageable number of system calls 26 for the detector and permits functionality of the detection software without concern for operating system stall.

Figure 7:
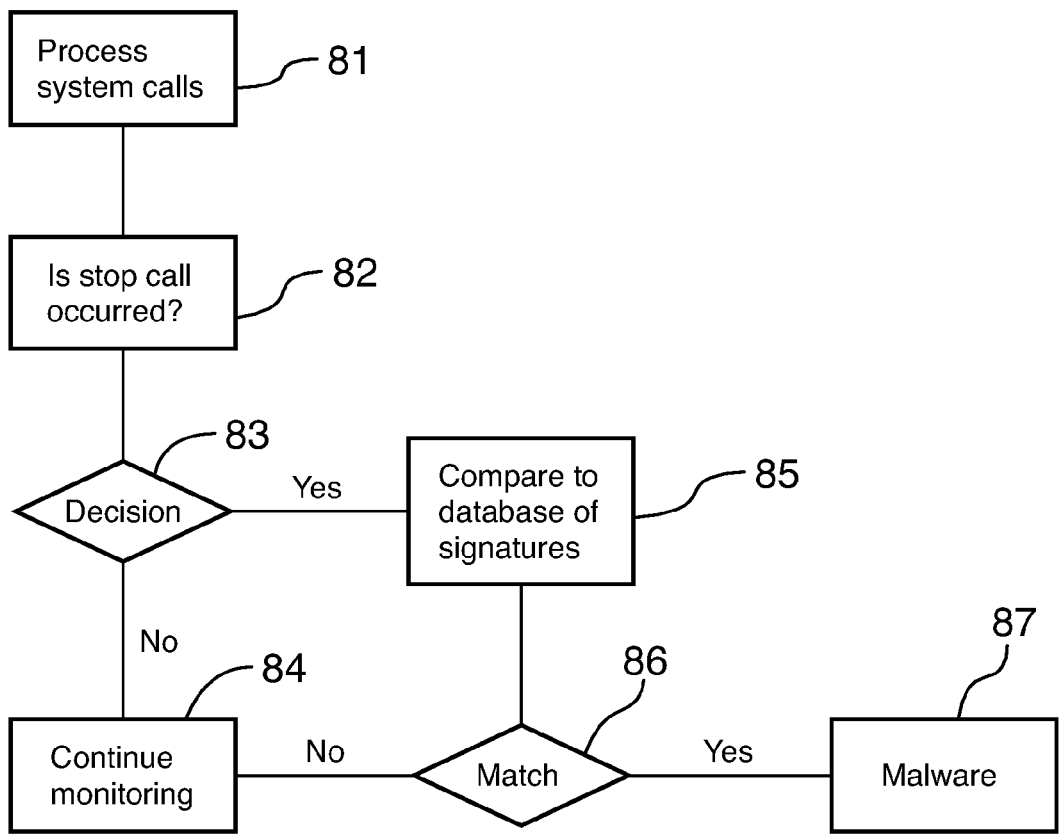
FIG. 7 is a flow diagram showing stop call processing of the present invention.

As shown in FIG. 7, the detection process begins in block 81 by processing the systems calls 26 that were passed on following the filtering process. The systems calls 26 are checked in block 82 for stop calls 28 and a decision is made in block 83, whereby monitoring continues in block 84 if no stop call 28 is found and comparison to malware is undertaken in block 85 if a stop call is found. This comparison is made by performing a similarity check between the system calls history of the subject thread and the database of signatures 22 received from the server. If a match is determined to be made in block 86, the subject thread is identified as exhibiting a malware action and is addressed in block 87.

Figure 9:
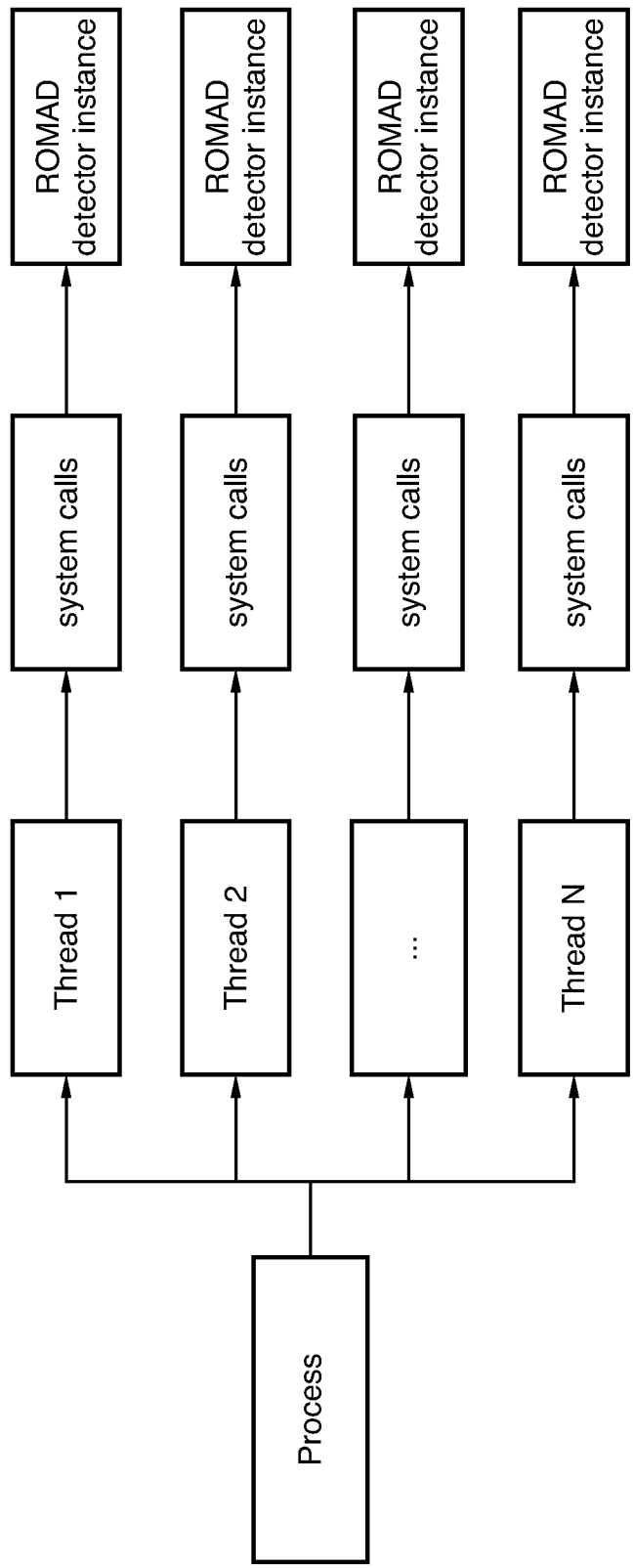
FIG. 9 is a block diagram showing the per-thread detection of the present invention.

As shown in FIG. 9, the signature search within the system calls history is done on a per-thread basis and it is determined if the malware actions are occurring in the thread. Per-thread aggregation is also done on a per-process basis to determine if malware actions are occurring in different threads. In this way, malware is detected even if it is spread across multiple threads.

When a subject thread is identified as exhibiting a malware action, it is addressed at its fixing moment 29. A means of addressing the malware may include, but is not limited to, terminating the offending software. The restore processes may then invoked, including malware file deletion from the hard drive and deletion of the malware registry hives. At this time the user may be informed of other options.

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in this description all such modifications and equivalents.

What is claimed is:

1. A malware detection and diffusion system comprising:
at least one server side computer; and at least one client side computer;
wherein:
  at least one malware sample is processed in at least one server side computer by intercepting all of the malware's system calls in kernel mode;
  at least one signature is formed for each malware sample by a server side computer having at least one stop call at or prior to a fixing moment;
  the signature is distributed by the server side computer to at least one client side computer,
wherein:
  a driver hooks all of the system calls at the kernel level of the operating system of the client side computer in real time, without use of emulation;
  the systems calls are processed by a filter to remove trusted system calls;
  the system calls not removed by the filter are accumulated on a per-thread basis and checked for a stop call;
  a detector compares the thread associated with the stop call to the signature for a match with malware prior to the fixing moment; and
  the thread that is matched with malware is addressed at the fixing moment.

2. The malware detection and diffusion system of claim 1, wherein the signature contains at least one junk system call inserted in any position.

3. The malware detection and diffusion system of claim 1, wherein the filter uses a multiplicity of filtering process levels.

4. The malware detection and diffusion system of claim 3, wherein the filtering process levels comprise at least the following levels:
  a filtering process level which identifies whether a system call is associated with a trusted process;
  a filtering process level which identifies whether a system call belongs to a trusted module;
  a filtering process level which identifies whether a system call is generated by an operating system loader;
  a filtering process level which identifies whether a system call has an invalid argument; and
  a filtering process level which identifies whether a system call is associated with low distribution N-gram.

5. The malware detection and diffusion system of claim 1, wherein the detector compares the thread associated with the stop call to the signature by performing a similarity check between system calls history of the thread and the signature.

6. The malware detection and diffusion system of claim 1, wherein the thread associated with the stop call that is matched with malware is addressed by terminating the process associated with the thread.

7. A method for detecting and diffusing malware on a computer, the method comprising the steps of:
  processing at least one malware sample on at least one server side computer by intercepting all of the malware's system calls in kernel mode;
  forming a signature for each malware sample having at least one stop call at or prior to a fixing moment;
  distributing the signature to at least one client side computer;
  hooking all of the system calls at the kernel level of the operating system of the client side computer in real time, without use of emulation;
  processing all of the hooked system calls through a filter to remove trusted system calls;
  accumulating the system calls not removed by the filter process on a per-thread basis;
  checking the system calls not removed by the filter for a stop call;
  comparing the thread associated with the stop call to the signature for a match with malware prior to the fixing moment; and
  addressing the thread matched with malware at the fixing moment.

8. The method of claim 7, wherein the signature contains at least one junk system call inserted in any position.

9. The method of claim 7, wherein the filter uses a multiplicity of filtering process levels.

10. The method of claim 9, wherein the filtering process levels comprise at least the following levels:
  a filtering process level which identifies whether a system call is associated with a trusted process;
  a filtering process level which identifies whether a system call belongs to a trusted module;
  a filtering process level which identifies whether a system call is generated by an operating system loader;
  a filtering process level which identifies whether a system call has an invalid argument; and
  a filtering process level which identifies whether a system call is associated with low distribution N-gram.

11. The method of claim 7, wherein a detector compares the thread associated with the stop call to the signature by performing a similarity check between system calls history of the thread and the signature.

12. The method of claim 7, wherein the thread associated with the stop call that is matched with malware is addressed by terminating the process associated with the thread.

13. A non-transitory computer readable medium comprising software comprising:
  code for processing at least one malware sample on at least one server side computer by intercepting all of the malware's system calls in kernel mode;
  code for forming a signature for each malware sample having at least one stop call at or prior to a fixing moment;
  code for distributing the signature to at least one client side computer;
  code for hooking all of the system calls at the kernel level of the operating system of the client side computer in real time, without use of emulation;
  code for processing all of the hooked system calls through a filter to remove trusted system calls;
  code for accumulating the system calls not removed by the filter process on a per-thread basis;
  code for checking the system calls not removed by the filter for a stop call;
  code for comparing the threads associated with the stop call to the signature for a match with malware prior to the fixing moment; and
  code for addressing the thread matched with malware at the fixing moment.

14. The non-transitory computer readable medium of claim 13, further comprising code for the signature to contain at least one system call inserted in any position.

15. The non-transitory computer readable medium of claim 13, further comprising code for the filter to use a multiplicity of filtering process levels.

16. The non-transitory computer readable medium of claim 15, further comprising code for the filtering process levels to comprise at least the following levels:
  a filtering process level which identifies whether a system call is associated with a trusted process;
  a filtering process level which identifies whether a system call belongs to a trusted module;

a filtering process level which identifies whether a system call is generated by an operating system loader;

a filtering process level which identifies whether a system call has an invalid argument; and a filtering process level which identifies whether a system call is associated with low distribution N-gram.

17. The non-transitory computer readable medium of claim 13, further comprising code for a detector to compare the thread associated with the stop call to the signature by performing a similarity check between system calls history of the thread and the signature.

18. The non-transitory computer readable medium of claim 13, further comprising code for addressing the thread associated with the stop call that is matched with malware by terminating the process associated with the thread.

19. The malware detection and diffusion system of claim 1, wherein the detector performs the per-thread system calls accumulation.

20. The malware detection and diffusion system of claim 19, wherein the detector performs the per-thread system calls accumulation on a per-process basis.

21. The malware detection and diffusion system of claim 20, wherein the detector performs the per-thread system calls accumulation on a per-process basis to allow for multi-threaded malware detection.

22. The malware detection and diffusion system of claim 21, wherein the detector performs the per-thread system calls accumulation on a per-process basis to allow for detection of thread-spreading attempts.

23. The method of claim 7, wherein a detector performs the per-thread system calls accumulation.

24. The method of claim 23, wherein a detector performs the per-thread system calls accumulation on a per-process basis.

25. The method of claim 24, wherein a detector performs the per-thread system calls accumulation on a per-process basis to allow for multi-threaded malware detection.

26. The method of claim 25, wherein a detector performs the per-thread system calls accumulation on a per-process basis to allow for detection of thread-spreading attempts.

27. The non-transitory computer readable medium of claim 13, further comprising code for a detector to perform the per-thread system calls accumulation.

28. The non-transitory computer readable medium of claim 27, further comprising code for a detector to perform the per-thread system calls accumulation on a per-process basis.

29. The non-transitory computer readable medium of claim 28, further comprising code for a detector to perform the per-thread system calls accumulation on a per-process basis to allow for multi-threaded malware detection.

30. The non-transitory computer readable medium of claim 29, further comprising code for a detector to perform the per-thread system calls accumulation on a per-process basis to allow for detection of thread-spreading attempts.

* * * * *